Feb. 1, 1955 W. F. KLUGE 2,701,061
OSCILLATING DEVICE WITH TWO COUNTEROSCILLATING MASSES
Filed Oct. 2, 1951
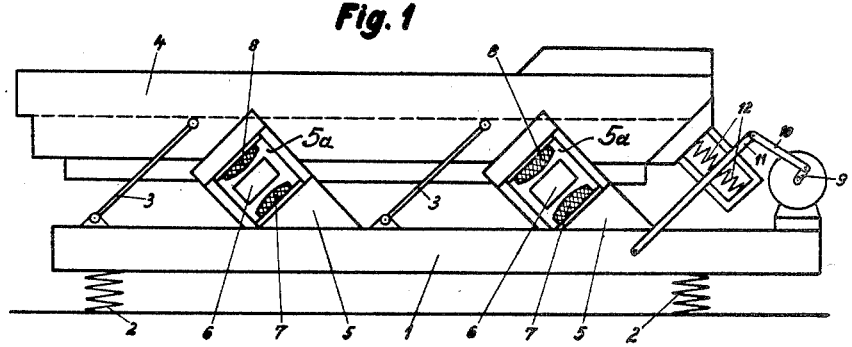
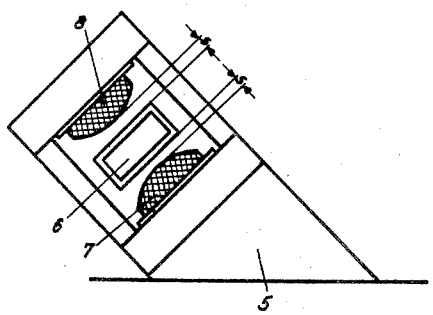
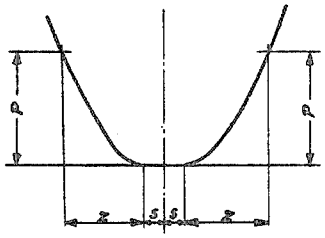
Inventor:
Wilhelm F. Kluge
By
Patent Agent

United States Patent Office 2,701,061
Patented Feb. 1, 1955

2,701,061

OSCILLATING DEVICE WITH TWO COUNTER-OSCILLATING MASSES

Wilhelm F. Kluge, Essen, Germany, assignor to Fried. Krupp Stahlbau Rheinhausen, Rheinhausen, Germany Application October 2, 1951, Serial No. 249,245

Claims priority, application Germany October 7, 1950

2 Claims. (Cl. 209—330)

The present invention relates to oscillating devices, and, more specifically, to oscillating devices with two counter-oscillating masses having rubber buffers arranged therebetween.

Between the two oscillating masses of a known oscillating sifter of this type, there are arranged rubber buffers which are adapted to store the forces of inertia of the oscillating masses when the latter are swinging in one direction and to release these forces again to the oscillating masses when the latter are swinging in the opposite direction. In order to obtain even oscillating conditions, the just mentioned known oscillating sifter has in addition to the said rubber buffers also semi-circular rubber buffers having a non-linear characteristic. Such an arrangement, however, has the drawback that the rubber buffers are in continuous engagement with each other and even in the position of their greatest distension must have a certain remaining pre-tension. In as much as with full load, the compression of the rubber buffers must be at a definite ratio with regard to the total height of the buffers, it is necessary with such an arrangement that the rubber buffers have a predetermined minimum height. Thus, for instance, with the stroke A of a sifting box equalling $\pm$ 1 centimeter, the rubber spring must have a height of approximately 20 centimeters.

It is, therefore, an object of this invention to provide an oscillating device with two counteroscillating masses which will overcome the above mentioned drawback and will make it possible to operate with rubber buffers materially reduced over those heretofore necessary.

It is another object of this invention to provide an oscillating device of the type set forth above, which will materially simplify the structure of the oscillating device.

It is also an object of this invention to provide an oscillating device with two counteroscillating masses, in which the rubber buffers arranged between said masses are so shaped that the contacting parts of the sifter box will smoothly set down on the rubber buffers during the oscillating operation.

These and other objects and advantages of the invention will appear more clearly from the following specification in connection with the accompanying drawings in which:

Fig. 1 diagrammatically illustrates a side view of an oscillating sifter according to the present invention.

Fig. 2 shows the arrangement of the rubber buffers on a scale somewhat larger than that of Fig. 1.

Fig. 3 illustrates the spring characteristic of rubber buffers used according to the present invention.

General arrangement

As mentioned above, the present invention concerns an oscillating device with two counteroscillating masses having arranged therebetween rubber buffers. However, in contrast to the heretofore known devices of this type, the arrangement according to the present invention is characterized in that in the direction of oscillation at both sides of means connected to one of said oscillating masses, energy storing means in form of rubber buffers are arranged so that the said rubber buffers within a range near the central or intermediate position of the said one oscillating mass remain unloaded and receive and again release the oscillating energy only beyond said range. Preferably, the said rubber buffers receive and again release the oscillating energy only within the range of the reversal positions. Thus, within the said range between the fully effective rubber buffers, the said one oscillating mass moves within the space completely or nearly completely unimpededly with even velocity up to the respective point of reversal. This oscillating mass, therefore, is made to rebound back and forth between the rubber buffers. In this way, the structure of the oscillating device is materially simplified while simultaneously bringing about a considerable saving in rubber.

In order that those parts which are connected to the sifter box and are reciprocating between the buffers may softly set down on said buffers, the respective buffer surfaces to be connected by said parts are according to the present invention preferably given a calotte shape.

Structural arrangement

Referring now to the drawing in detail, the structure shown therein comprises a supporting frame 1 which is yieldingly supported by springs 2 with regard to a stationary base. Supported by the frame 1 by means of normally inclined pivoted rods or leaf springs 3 is a sifter box 4. At each side of the supporting frame 1 are arranged two supporting members 5 with window-like openings 5a which extend in the direction of oscillation of the sifter box 4, i. e. substantially perpendicular to the rods 3. Rigidly connected to the sifter box 4 at each longitudinal side thereof are two transverse pieces 6 which extend into the window-like openings 5a of the supporting members 5. As will be seen from the drawing, rubber buffers 7 and 8 are mounted on the supporting members 5 at both sides of the transverse pieces 6, when looking in the direction of oscillation.

A crank drive 9 actuates the rocking arm 11 by means of the connecting rod 10. The rocking arm 11 is located between coupling springs 12 which, in a manner known per se, bring about the counteroscillations of the two masses 1 and 4.

Referring now to Fig. 2 showing the arrangement of the rubber buffers on a larger scale than that of Fig. 1, it will be seen that the space between each rubber buffer 7 and 8 on one hand, and the respective adjacent side of the transverse piece 6 is designated with the latter $s$. These spaces $s$ are adjustable by adjusting the rubber buffers in any convenient manner or by replacing the transverse piece 6 by a thicker or thinner one. In this way it is possible to vary the stroke of the sifter box.

As will be clear from Fig. 3 illustrating the spring characteristic of the rubber buffers 7 and 8, the process of storing the energy does not begin at the central or intermediate position of the sifter box 4 but only after the sifter box has moved over the distance $s$ from its central position. While the rubber buffer is compressed by the amount $z$, the rubber buffer acts with a force $P$ against the respective accelerating force of the sifter box.

It is, of course, understood that the present invention is, by no means, limited to the specific structure shown in the drawings but also comprises any modifications within the scope of the appended claims.

What I claim is:

1. In combination in an oscillating device; a first oscillating mass; yielding means yieldably supporting said first oscillating mass; a second oscillating mass swingably connected to said first oscillating mass; oscillating power means arranged to cause said second oscillating mass to perform a certain desired and substantially the same oscillating stroke throughout the desired oscillation of said oscillating device; supporting means connected to said first oscillating mass; spaced rubber buffer means facing each other and carried by said supporting means; the rubber buffer means facing each other being spaced from each other by a distance less than said certain oscillating stroke of said second oscillating mass; and contact means connected to said second oscillating mass and extending between said rubber buffer means but spaced therefrom, when said second oscillating mass is in its central position, by a certain distance so that the buffer means will remain unloaded when oscillating through said distance from its central position.

2. An oscillating device according to claim 1, in which said certain distance between the contact means in the central position thereof and each of the adjacent rubber buffer means is variable.

References Cited in the file of this patent

FOREIGN PATENTS

| | | |
|---|---|---|
| 459,642 | Great Britain | Jan. 12, 1937 |
| 628,191 | Germany | Mar. 30, 1936 |
| 650,638 | Germany | Sept. 27, 1937 |
| 677,571 | Germany | June 28, 1939 |
| 725,833 | Germany | Sept. 30, 1942 |
| 903,113 | France | Jan. 8, 1945 |